US008903111B2

(12) United States Patent
Garet et al.

(10) Patent No.: US 8,903,111 B2
(45) Date of Patent: Dec. 2, 2014

(54) DEVICE FOR CONTROLLING AT LEAST ONE AUDIO SIGNAL AND CORRESPONDING ELECTRONIC MIXING CONSOLE

(75) Inventors: Francois Garet, Vannes (FR); Nicolas Robic, Beignon (FR)

(73) Assignee: Guillemot Corporation, Chantepie (FR)

( * ) Notice: Subject to any disclaimer, the term of this patent is extended or adjusted under 35 U.S.C. 154(b) by 434 days.

(21) Appl. No.: 13/303,677

(22) Filed: Nov. 23, 2011

(65) Prior Publication Data

US 2012/0134513 A1  May 31, 2012

(51) Int. Cl.
*H04B 1/00* (2006.01)
*G11B 19/02* (2006.01)
*G05G 1/08* (2006.01)
*G10H 1/32* (2006.01)
*G09G 5/00* (2006.01)
*G11B 5/58* (2006.01)

(52) U.S. Cl.
CPC *G11B 19/02* (2013.01); *G05G 1/08* (2013.01); *G10H 1/32* (2013.01); *G10H 2210/241* (2013.01)
USPC .......................... 381/119; 345/156; 369/53.41

(58) Field of Classification Search
CPC ... G10H 2210/241; G10H 1/0091; H04B 1/00
USPC ................... 381/119, 17; 369/53.41; 345/156
See application file for complete search history.

(56) References Cited

U.S. PATENT DOCUMENTS

2008/0212437 A1* 9/2008 Kataoka et al. ............ 369/53.41

* cited by examiner

*Primary Examiner* — Paul S Kim
*Assistant Examiner* — Ammar Hamid
(74) *Attorney, Agent, or Firm* — Blakely Sokoloff Taylor & Zafman LLP

(57) ABSTRACT

A device (20) for controlling an audio signal comprising at least: means for commanding, rotationally mobile around an axis of rotation (A) relatively to a footing, first means for detecting a movement in rotation of the commanding means, capable of delivering a first signal, second means for detecting a movement in translation along an axis (z) substantially parallel to the said axis of rotation (A), capable of delivering a second signal. According to the invention, the said second means for detecting comprise at least one pressure sensor (210) delivering said second signal and comprising at least a upper part (210A), a lower part (210C), and a central part (210B) located between the upper part and the lower part, at least one of these parts being rigid, and at least one of these parts being elastic and deformable along an axis substantially parallel to the said axis of rotation (A).

18 Claims, 7 Drawing Sheets

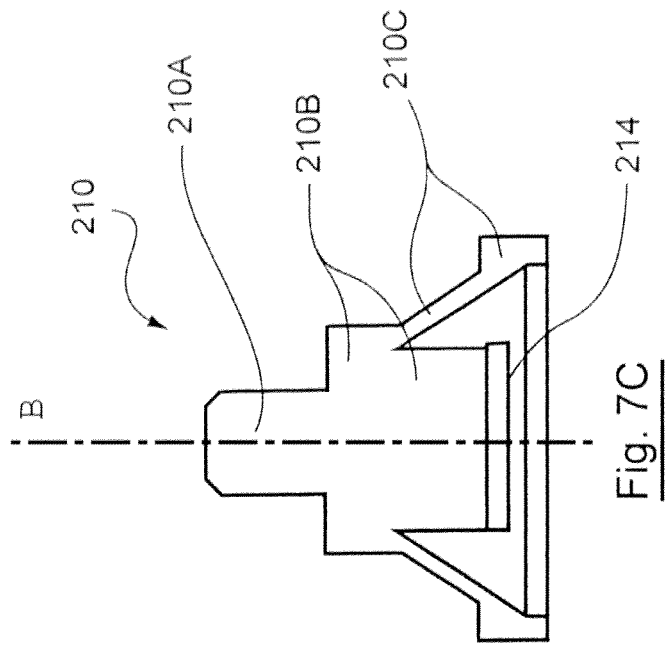
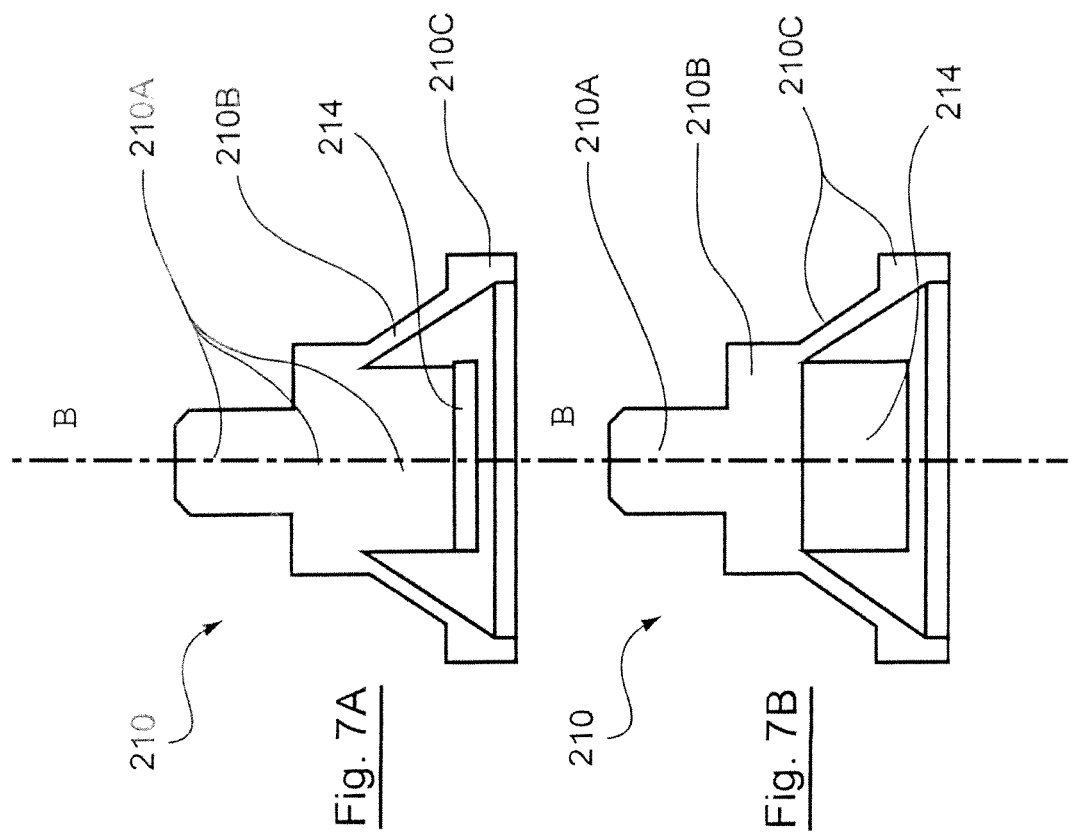

DEVICE FOR CONTROLLING AT LEAST ONE AUDIO SIGNAL AND CORRESPONDING ELECTRONIC MIXING CONSOLE

FIELD OF THE INVENTION

The field of the invention is that of electronic music equipment.

More specifically, the invention relates to a device for controlling an audio signal and an electronic mixing console implementing such a control device.

BACKGROUND

Electronic mixing controllers or consoles are widely used by professional or amateur DJs (disc-jockeys) to select and broadcast pieces of music in discotheques or a parties and to interact with these pieces of music (if necessary with visual accompaniments such as images, video material or visual effects) especially to accelerate, slow down and/or repeat a portion (these are processing operations known as "mixing").

These electronic mixing consoles are an alternative or a complement to vinyl turntables (or record players). They can furthermore be used to mix audio-video clips and synchronize music with video (or vice versa).

There are relatively compact mixing consoles which can be easily transported. Some of them can be connected to a data-processing apparatus, a laptop computer, for example, on which a mixing software program is implemented, for example the "Virtual DJ" (registered mark) software from the firm Atomix Productions which is capable of mixing audio and video tracks. With this software, it is possible to perform scratching with the video in the same way as with audio only, i.e. with the same impact on the sound track of the video clip as if a soundtrack having no visual accompaniment were to be mixed.

Classically, a mixing console comprises a control surface on which there are control means such as for example rotary buttons, push buttons, rectilinear potentiometers or faders used for setting the audio signals (in terms of equalization, volume, balance, gain etc).

One or more jog wheels or jog dials are also provided. A jog wheel of this kind enables the user to move within musical libraries or within a musical piece or else accelerate or slow down the playback of a musical piece.

During the reading of a piece of music, a pressure exerted by a user on the jog wheel enables the creation of a sound effect known as a "scratch" as when a DJ places his hand on a vinyl microgroove record when it is being played on a record player (thus interrupting its rotation) and moves the record forward or backward.

It is desirable that the mixing console should detect such scratching on the part of the user, i.e. the action of the user's hand or fingers on the jog wheel.

Solutions have been proposed implementing a capacitive electrical detection device. This solution has the drawback of requiring the use or addition of a microcontroller enabling this type of detection, which is not supported by all present-day microcontrollers. The cost of the electronics is therefore increased.

Furthermore, the working of a capacitive detection device of this kind can be disturbed by the presence of static electricity or for example by the fact that the user's shoes are not ground-connected and therefore electrically insulate the user.

Furthermore, it is desirable for the user to know that the mixing console has detected the pressure that he is exerting on the jog wheel, i.e. the weight of his hand or fingers when he makes a scratch.

In addition, certain jog wheels are not sufficiently silent.

Besides, most current-day mixing consoles do not allow the DJ to adjust the resistance of the rotation of the jog wheel or wheels according to preference.

More generally, present-day mixing consoles do not offer any sensation close to that of vinyl turntables.

Nor are they compatible with jog wheels of different diameters.

Finally the jog wheels of current mixing consoles detecting the pressure of the user's hand or fingers use numerous parts which make them complex to assemble and increases their cost.

In other words, existing mixing consoles do not give full satisfaction.

SUMMARY OF THE INVENTION

It is a goal of the invention especially to overcome these prior-art drawbacks.

More specifically, it is a goal of the invention, in at least one embodiment, to provide a device for controlling an audio signal that implements reliable and precise means of detecting a translation movement of the control device.

Another goal of the invention is, according to at least one embodiment, to provide a robust and reliable device for controlling an audio signal, that implements a limited number of parts and is relatively simple to assemble.

It is also a goal of the invention, according to one embodiment, to provide a device for controlling an audio signal that gives a sensation similar to that provided by vinyl turntables.

These goals as well as others that shall appear here below are achieved by means of a device for controlling at least one audio signal comprising at least:

means for commanding comprising at least one plate and one collar, said plate and said collar being mounted so as to be rotationally mobile along an axis of rotation relatively to a footing, first means for detecting a movement in rotation of the means for commanding, capable of delivering a first signal, second means for detecting a movement in translation, along an axis substantially parallel to the axis of rotation, of said plate relatively to said footing, capable of delivering a second signal, said first signal and/or said second signal feeding means for processing said at least one audio signal.

According to the invention, said second means for detecting comprise at least one pressure sensor delivering said second signal and comprising at least one rigid upper or lower part and one respectively lower or upper part, elastic and deformable along an axis substantially parallel to the axis of rotation of the means for commanding.

The control device of the invention takes the form of a jog wheel that is mobile in rotation and in translation. This jog wheel can be pushed in by a user (by application of a pressure of the hand or preferably by the simple weight of the DJs hand or fingers, i.e. without the DJ having to exert force in order to push it in) to generate a sound effect and return to neutral position as soon as the pressure is relaxed.

In order to reliably detect this pushing-in movement (i.e. the movement in translation), the control device of the invention implements mechanical means for detecting in the form of one or more pressure sensors for detecting touch or weight.

A sensor of this kind has a rigid part and a deformable elastic part, the latter being capable of being deformed as soon as the jog wheel is pushed in by the user.

Mechanical means for detecting of this kind can be implemented with any type of microcontroller, unlike in the case of capacitive electrical detection systems which, as it happens, require the implementation of specific microcontrollers, in addition to being particularly sensitive to static electricity.

Furthermore, the elasticity of these means for detecting enables the elements that are mobile in translation to be brought back from a "pushed-in" position to the neutral position.

Owing to the implementation of such mechanical means for detecting, the detection of the weight of the hand activating a scratch effect is:

natural: as on the vinyl turntables;

sure: there are no disturbances related to static electricity, and intuitive: there is no calibration needed unlike in capacitive electrical detection systems for which the detection threshold has to be calibrated so that the detector detects the hand when it touches the jog wheel and not before it touches it. If the setting is too sensitive, bringing the hand to within 1 mm of the wheel will be enough to engage the detection (and would therefore trigger the scratching in untimely fashion). If the setting is not sensitive enough, a simple contact of the fingertips will not be enough to engage the detection (then, either a sharper contact will be needed or a larger portion of the hand will have to be brought close to the wheel, thus adversely affecting the scratching maneuver). Furthermore, if used by another user, the mixing console will have to be recalibrated).

A jog wheel according to the invention is as natural as a vinyl turntable, with the user easily getting a feel for the way to apply his hand or the fingers on the jog wheel, i.e. the way to exert pressure on the wheel in order to pass into scratch mode.

Advantageously, the device of the invention comprises a support bearing at least said plate and mounted so as to be mobile in translation but not in rotation relatively to said footing, said support cooperating with said second means for detecting.

The control device is compatible with means for commanding having different sizes, shapes and inertia values and prevents, or at the very least limits, any wobbling of the means for commanding whatever their diameter.

In other words, the support mobile in translation enables the adapting of different diameters of means for commanding.

When the jog wheel is pushed in by the user, this support mobile in translation is moved and prompts a deformation of the elastic and deformable part of the pressure sensor.

In one particular embodiment, said collar is mounted so as to be mobile in translation, along said axis of rotation, relatively to said footing.

The plate and the collar can therefore fixedly joined. At least one of the pressure sensors is activated when a pressure is applied only to the collar, only to the plate or to the collar and the plate.

Preferably, said pressure sensor is a monobloc unit.

The rigid part (or rigid parts) and the deformable part of the pressure sensor can be manufactured in only one piece made out of elastomer for example.

Preferably, said deformable part and the one or more rigid parts of the pressure sensor are coaxial.

In one embodiment of the invention, said pressure sensor comprises at least one switching means housed inside said elastic and deformable part and fixedly joined to said rigid part, said at least one switching means being designed to close an electrical circuit when a predetermined pressure is exerted on said plate and/or said collar.

Preferably, said switching means and said rigid part are coaxial.

Advantageously, said switching means comprise a carbon contact pill.

Thus, the deformation of the elastic and deformable part of the pressure sensor following pressure exerted on the plate and/or the collar prompts the closing of an electrical circuit by means of a carbon contact pill. This pill is housed in the elastic and deformable part of the pressure sensor and is fixedly joined to the rigid part of this sensor.

The implementation of carbon is advantageous in that this material is robust and costs very little.

In one alternative, the pill is made of copper or any other suitable material.

Advantageously, said means for commanding are fixedly joined to a bearing fixed to the mobile support.

Such a bearing may be a ball bearing, a roller bearing, a needle bearing, a roller bearing, a plain bearing (lubricated or magnetic bearing).

In yet another embodiment of the invention, the control device implements means for braking the movement in rotation of the means for commanding by application of a frictional force to said bearing.

In one particular implementation of the invention, said braking means comprise a screw, the frictional force applied depending on the tightening of said screw.

The braking device is mounted for example in the support mobile in translation and comprises a screw and a skid that slides in the support mobile in translation until it exerts a frictional force of varying magnitude (depending on the tightening of the screw) on the (ball) bearing.

Such a jog wheel thus implements a simple device to adjust the resistance to rotation of the jog wheel and a simple device to block the translation of the wheel (when the console is being transported, for example to reduce noise and/or maintain the service life of the pressure sensor).

In one particular embodiment of the invention, at least one central part of said plate is made out of a transparent or translucent material.

In one alternative embodiment, the entire plate is transparent or translucent.

In another embodiment of the invention, the control device implements display means visible through said at least one central part of the plate.

In one alternative, or as a complement, the control device implements luminous means visible through said at least one central part of the plate.

The detection by the control device of a pushing-in of the wheel can be indicated to the user by luminous and/or display means that are visible through the plate.

Advantageously, the support mobile in translation comprises a tubular upper part serving as a shaft or as a bearing for the rotation of the means for commanding.

In one particular implementation of the invention, said tubular upper part supports the display means and/or the luminous means.

Such a jog wheel is particularly robust, compact and simple to implement and assemble (because it has few parts).

The jog wheel of the invention is mobile in rotation on a bearing, thus enabling the centre to be released so as to place an illumination therein and if necessary a fixed display zone.

The structure of the jog wheel is furthermore compatible with jog wheels of different sizes, shapes (the table of the wheel may for example be cylindrical or truncated) and inertia values (the ring of the table may for example have different characteristics such as dimensions and density). The manufacturer of the jog wheel can therefore use the invention to manufacture wheels of different characteristics. Depending on his preferences, a user can replace a 12 cm-diameter jog wheel by a 30-cm diameter wheel for example. This makes it possible to have several jog wheels for one and the same mixing console without impairing its portable nature. The diameter of the jog wheel is little importance since a pedestal is made to pass through the ball bearing and since it is possible to place thereon an object larger than the ball bearing, for example a printed circuit board (PCB). The weight of the mobile parts of the jog wheel and the pressure exerted by the DJ (the user) are transmitted to a toothed wheel or encoding wheel and to the support mobile in translation and they get distributed on the footing through domes made of elastomer. The shape of the support mobile in translation, and especially its tubular pedestal and the columns of the support mobile in translation give it efficient guidance and the jog wheel therefore does not require additional guides which would make the jog wheel less silent during rotation and would add friction (and hence resistance to the vertical pressure when it is preferable that the DJ should not have to exert any force to activate the scratch mode, i.e. the weight of the hand should be enough to obtain scratching).

The jog wheel of the invention offers improved aesthetic value and a feel similar to that of vinyl turntables.

The invention also pertains to an electronic mixing console comprising at least one control device for the mixing of at least one audio signal as described here above.

BRIEF DESCRIPTION OF THE DRAWINGS

Other features and characteristics of the invention shall appear more clearly from the following description of a preferred embodiment, given by way a simple illustrative and non-exhaustive example, and from the appended drawings, of which:

FIGS. 7A, 7B and 7C are schematic views in section of a pressure sensor according to different embodiments.

DETAILED DESCRIPTION

6.1 Description of One Embodiment

The invention shall be described in the context of a portable mixing console or controller. This console is for example connected to a laptop computer (not shown) on which a mixing software program is implemented. It is possible to connect a microphone and a set of earphones to the console.

Figure 1:
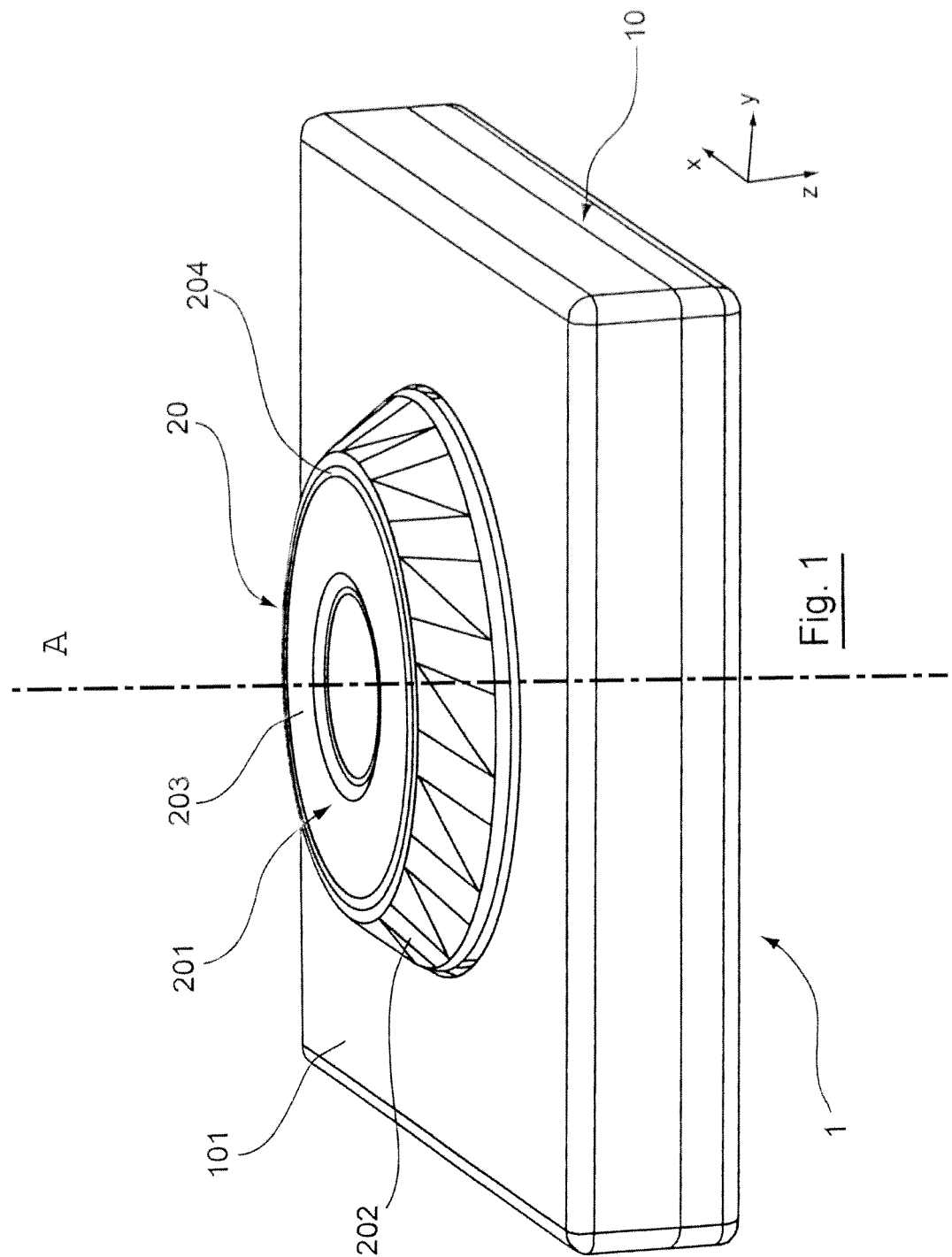
FIG. 1 is a view in perspective of a mixing console implementing a jog wheel according to the invention.

A mixing console 1 of this kind is shown in FIG. 1 and comprises a pack (or frame) 10 having a control surface 101 comprising a jog wheel 20. This jog wheel 20 is placed in a housing made in the pack 10 of the mixing console 1. This FIG. 1 shows only a collar 202 (or crown 202) and a table 201 (comprising in this example a plate 203, a ring 204 and the part of the collar 202 that is parallel to the axis y and flush with the plate 203 and the ring 204) of the wheel 20 are visible.

The mixing console is preferably equipped with anti-skid pedestals. Means for commanding (not shown) such as for example rotary buttons, push buttons, rectilinear potentiometers for the audio setting (equalization, volume, balance, gain), the setting of the microphone input and the earphone output especially are placed on the control surface 101.

The jog wheel 20 has for example a diameter of 12 cm and a height of 1.9 cm. When a musical piece (i.e. an audio track) is being played by the laptop, various actions by the user on the jog wheel 20 and more specifically on its table 201 and/or on its collar 202 are used to control the mixing software program. Thus:

a rotation of the jog wheel 20 (by an action of the user's hand on the collar 202) around an axis of rotation A without pressure on the table 201 activates the shifts within the musical piece;

a rotation of the wheel 20 around an axis of rotation A with pressure on the table 201 activates a scratch effect. This pressure of the user's hand or fingers on the table 201 causes the jog wheel 20 and, more specifically, the table 201 and the collar 202 to be pushed in along the axis z on a travel length of about 0.5 mm.

It will be noted that, when no rotation and no pressure is applied to the jog wheel 20, the musical piece is played quite normally and that a rotation without pressure on the wheel 20 generates an effect known as a "pitch bend" effect as when the external ring of a vinyl turntable is put into rotation. The pitch bend temporarily modifies playback speed, which also habitually changes the frequency of the note being played but not if the DJ has preliminarily activated the master temp effect (which consists in not changing pitch when the playback speed has to be varied).

It will be noted that the processing (not shown) of the audio signal or signals according to the detection of the rotation and/or the translation of the wheel can be implemented in the laptop computer connected to the console or in a circuit embedded in the console.

The width of the collar 202 is chosen so as to enable easy handling. The collar 202 on which an embossment is made is preferably made of an non-slip material or coated with non-slip paint so as to further optimize its handling.

Any action along the axis z (for example the weight of the user's hand) on the jog wheel 20 (i.e. on the table and/or the collar) is detected by a pressure sensor (mechanical detection of touch or weight) which uses one or more carbon contact domes (or membranes or pads) made of elastomer.

In the embodiment that shall be described here below, the mechanical pushing in of the wheel 20 is calibrated by six elastomer domes. These elastomer domes furthermore serve to bring the elements of the jog wheel 20, which are mobile in translation along an axis z which is substantially parallel to the axis of rotation A (or which is preferably the axis of rotation A), especially the table 201, from a "pushed-in" position to a neutral position.

Figure 2:
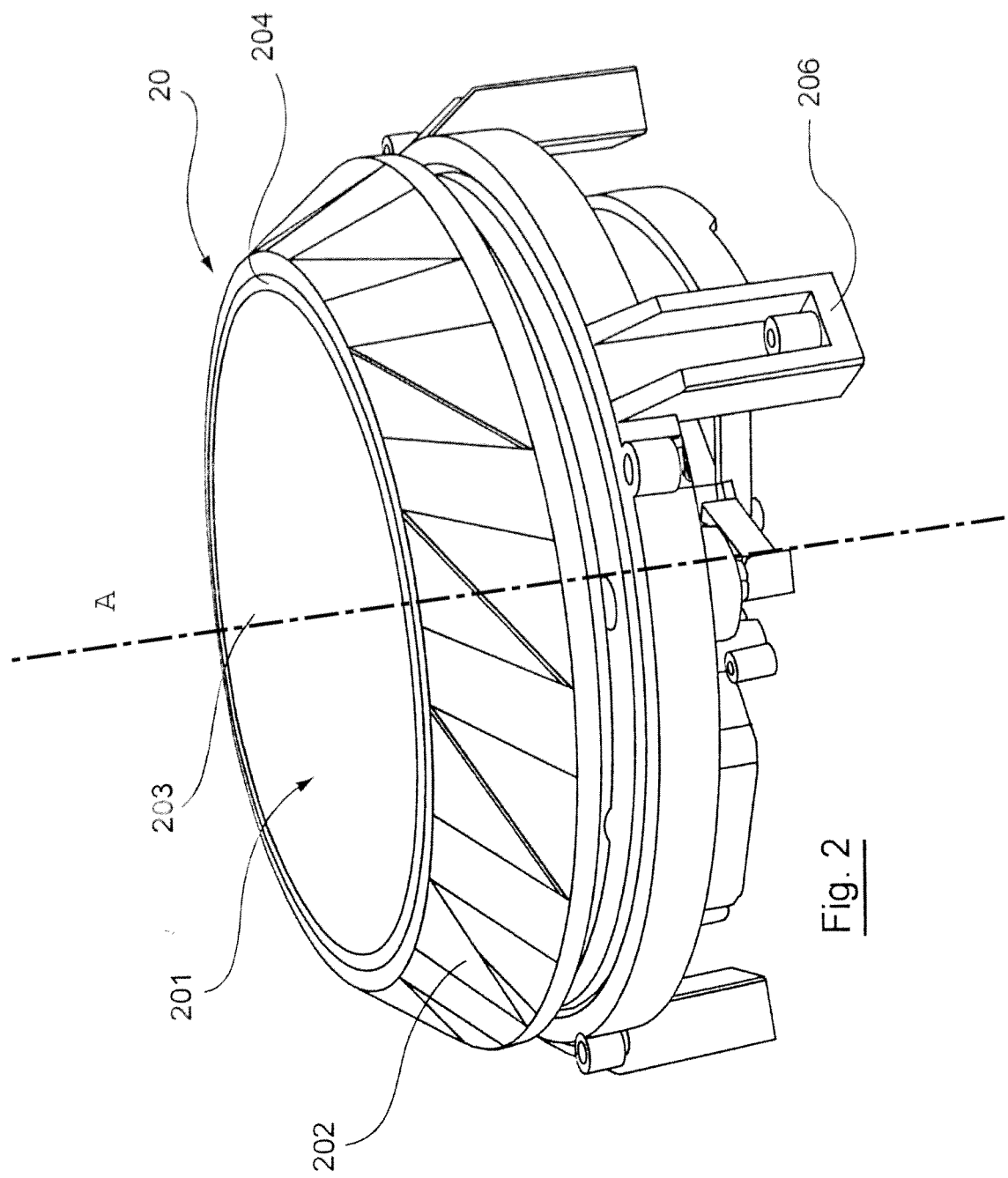
FIG. 2 is view in perspective of the structure of a jog wheel according to one embodiment of the invention.

FIG. 2 is a view in perspective of the jog wheel 20 alone. In this figure, it is possible to distinguish the table 201 (comprising especially the plate 203 and the ring 204), the collar 202 and the fixed support 206 (or footing or base) which enables the jog wheel 20 to be affixed by screws into the pack 10 of the mixing console 1.

Figure 3:
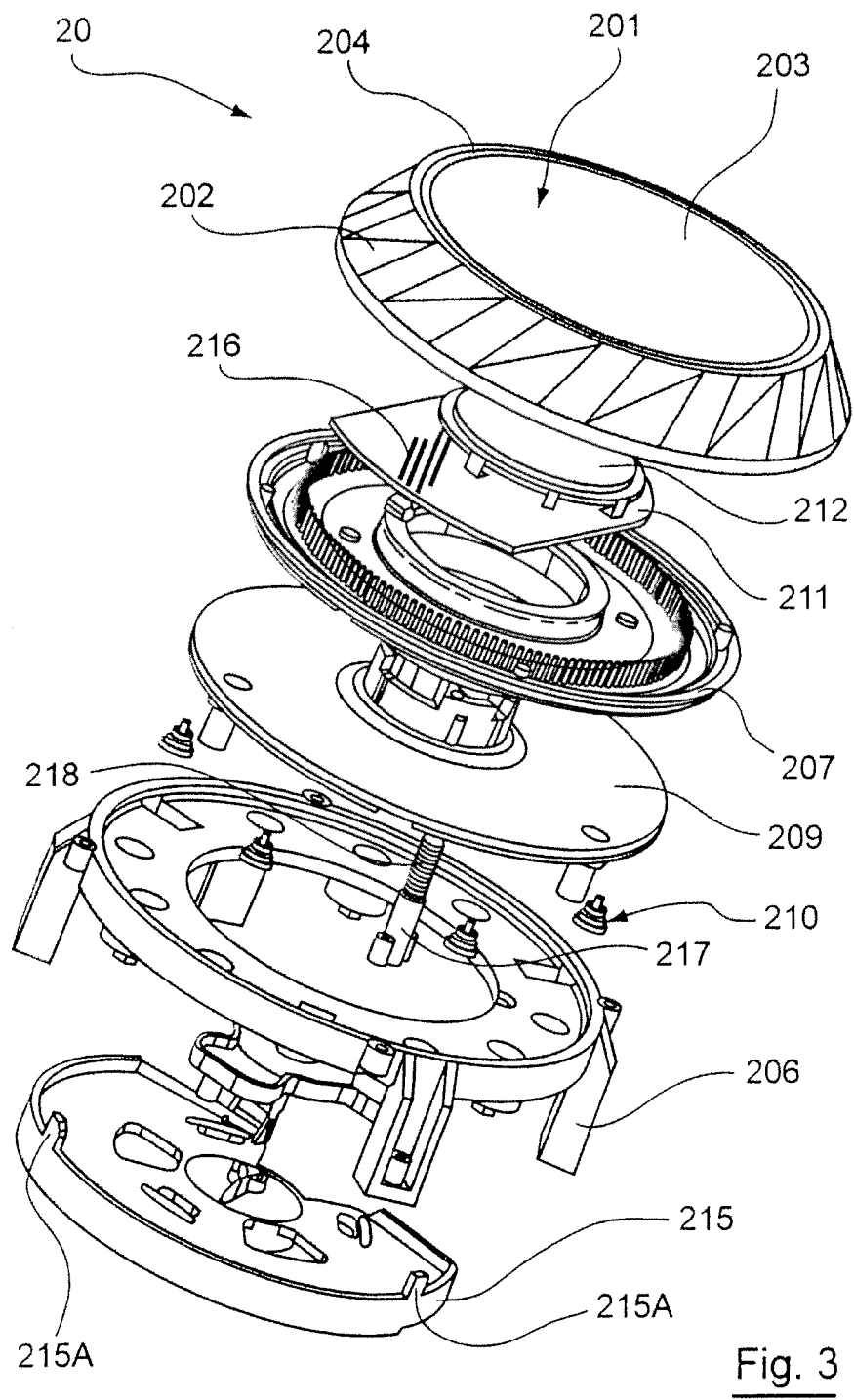
FIGS. 3 to 5 are exploded views of the jog wheel of FIG. 2.
Figure 4:
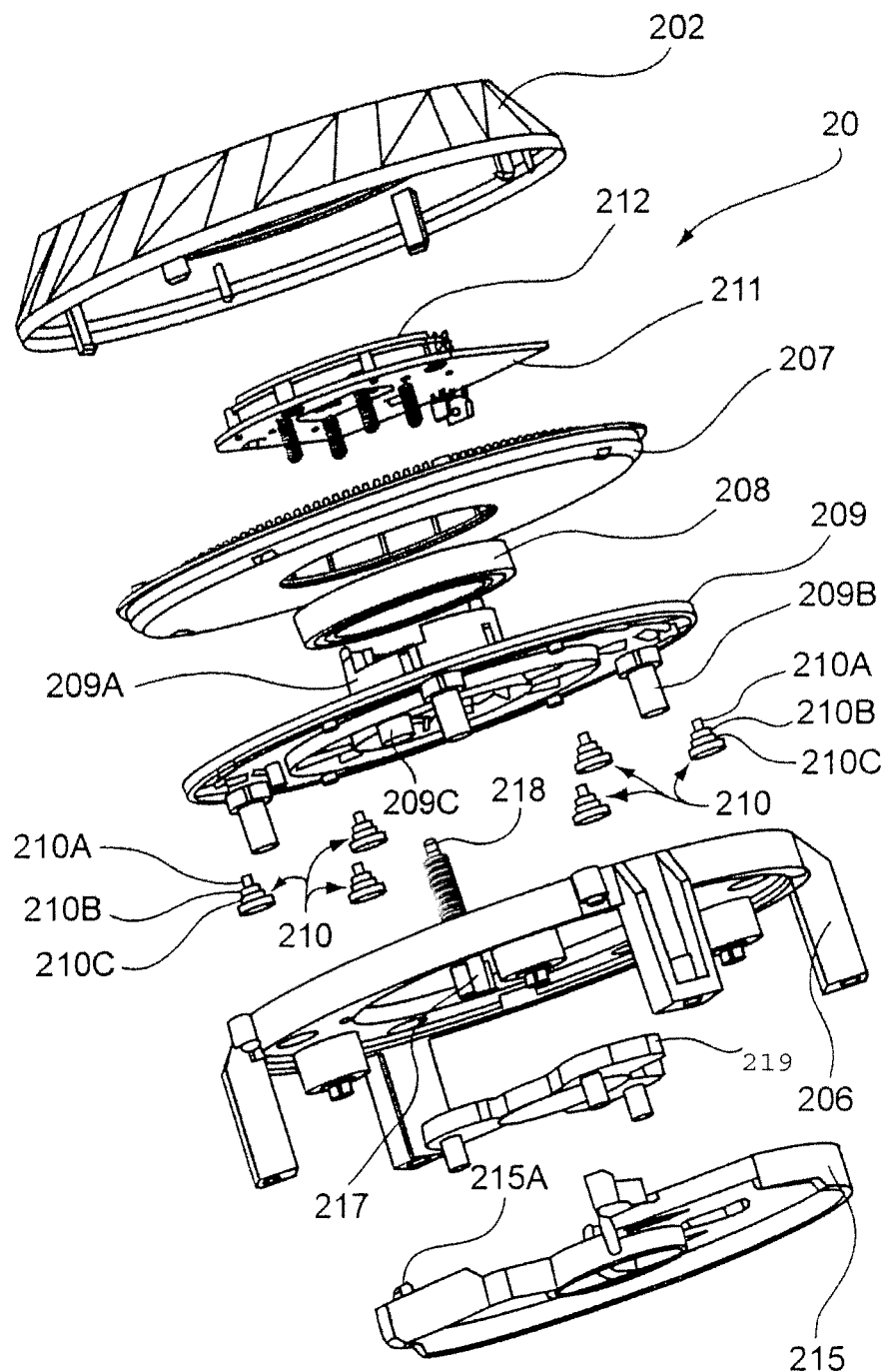
Figure 5:
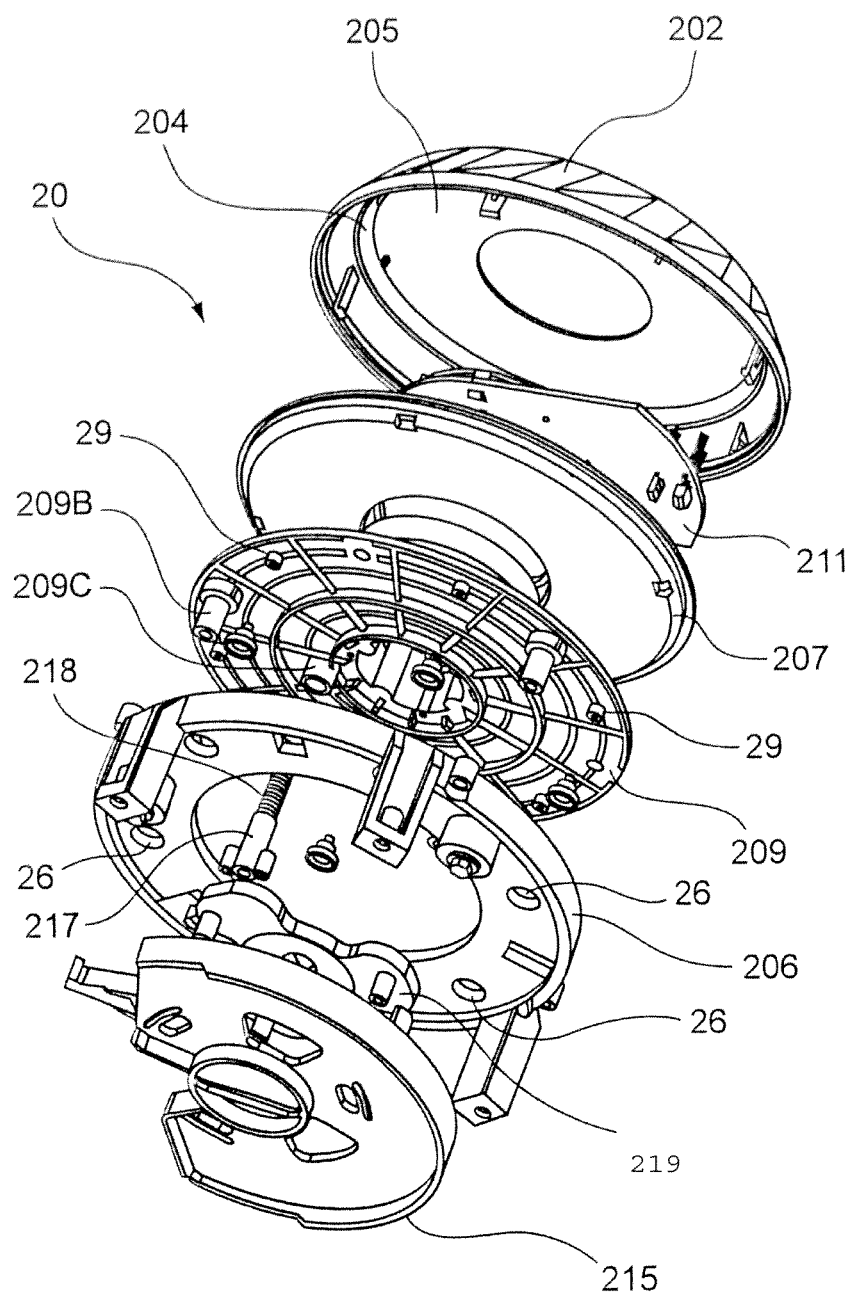

FIGS. 3 to 5 are exploded views of the jog wheel of FIG. 2. The table 201 of the jog wheel 20 comprises circular transparent plate 203 (made of Plexiglas for example). The plate 203 is fixedly joined to the collar 202 by means of a double-face adhesive 205, a metal ring 204 being inserted between the external rim of the plate 203 and the internal rim of the collar 202. This metal ring 204 is used for inertia and is aimed at improving the aesthetic value.

The plate 203 and the metal ring 204 of the table 201 are mobile in rotation around an axis A which is substantially parallel to the axis z and in translation along the axis z relatively to the fixed support 206.

The truncated-cone shaped collar 202 is fixedly joined to a toothed wheel or encoding wheel 207 (for example by being clipped on), the collar 202 and the toothed wheel 207 being mobile in rotation about the axis A which is substantially parallel to the axis z and in translation along the axis z relatively to the fixed support 206. In a known way, a toothed wheel of this kind is associated with a device 216 for detecting teeth (LED type optical system) borne by a printed circuit 211 to detect the characteristics (the sense of rotation, the amplitude and the speed in particular) of the rotation of the jog wheel 20.

This circular toothed wheel 207 is fixed to the exterior of a ball bearing 208 (more specifically, the exterior of the ball bearing 208 is fixed to a reinforcement part in the form of a circular hat without a crown which itself fixed to the toothed wheel 207 and which reinforces its structure), the interior of the bearing 208 being fixed to a support mobile in translation 209.

This support mobile in translation 209 is circular and comprises a tubular upper part (or pedestal) 209A, three cylindrical columns 209B and one hole 209C with screw thread crossed through which there goes a screw-type braking device or locking screw-type device 218.

This braking device is used to adjust the resistance to rotation of the jog wheel 20. This braking device 218 is mounted in the support mobile in translation 209 and comprises a hollow cylindrical base 217 (or hollow guide) on each side of which there is provided a threaded hollow cylinder designed to receive a screw to fix the braking device 218 to the pack 10 of the console. A screw or spring-based skid 218 housed in the hollow cylindrical base goes through the threaded hole 209C made in the support mobile in translation 209 and comprises at its end a skid that exerts a friction force on the ball bearing 208 that is greater or smaller (depending on the degree of tightening of the screw housed in the cylindrical base 217). A screwdriver can be inserted into the cylindrical base 217 from the lower surface of the pack 10 up to the head of this spring stop screw 218 (this prevents the screwdriver from slipping sideways and damaging the printed circuit 213). This spring stop screw 218 is partially hollow and, at its upper end (the end opposite the head of the screw), has a housing for a spring and a Teflon bead which is greased (this bead can be replaced by a trunnion or a skid made of Teflon). The bead cannot exit this housing. The bead acts on the outer part of the ball bearing 208 (or on an annular reinforcement plate that is not shown) and therefore brakes its rotation. The spring absorbs the force exerted by this bead and gives the user a better feel. This spring permits tightening in varying degrees on the bearing 208 (when it is compressed to the maximum, the tightening is the maximum). Consequently, the greater the extent to which the user tightens the spring stop screw by means of a screwdriver, the greater is the braking on the rotation of the jog wheel.

The support mobile in translation 209 is mobile in translation in the fixed support 206. The distance of travel of this support mobile in translation 209 along the axis z is of the order of 0.5 mm.

A locking wheel 215 has three lugs, each of which can act on one of three lower columns 209B of the support mobile in translation 209. The locking wheel 215 is mobile in rotation relatively to the fixed support 206 (and therefore relatively to the pack 10). The locking wheel 215 can have two positions. When the three lugs 215A are positioned respectively beneath the heads of the screws fixed to the columns 209B of the support mobile in translation 209, the movement of the support mobile in translation 209 is not possible (in other words, the jog wheel 20 is then held in a position of "blocked translation"). When the lugs are no longer beneath the heads of the screws, then it is possible for the support mobile in translation 209 to move (in other words the jog wheel 20 is then maintained in the position of "unlocked translation"). A stop 219 is fixed to the pack 10 by screws and limits the amplitude of the movement in rotation of the locking wheel 215 by means of three tabs which cooperate with three grooves in an arc of a circle made in the locking wheel 215.

The return from the "pushed-in" position to the neutral position of the support mobile in translation 209 is ensured by one or more (six in the embodiment described) elastomer domes 210.

Figure 6:
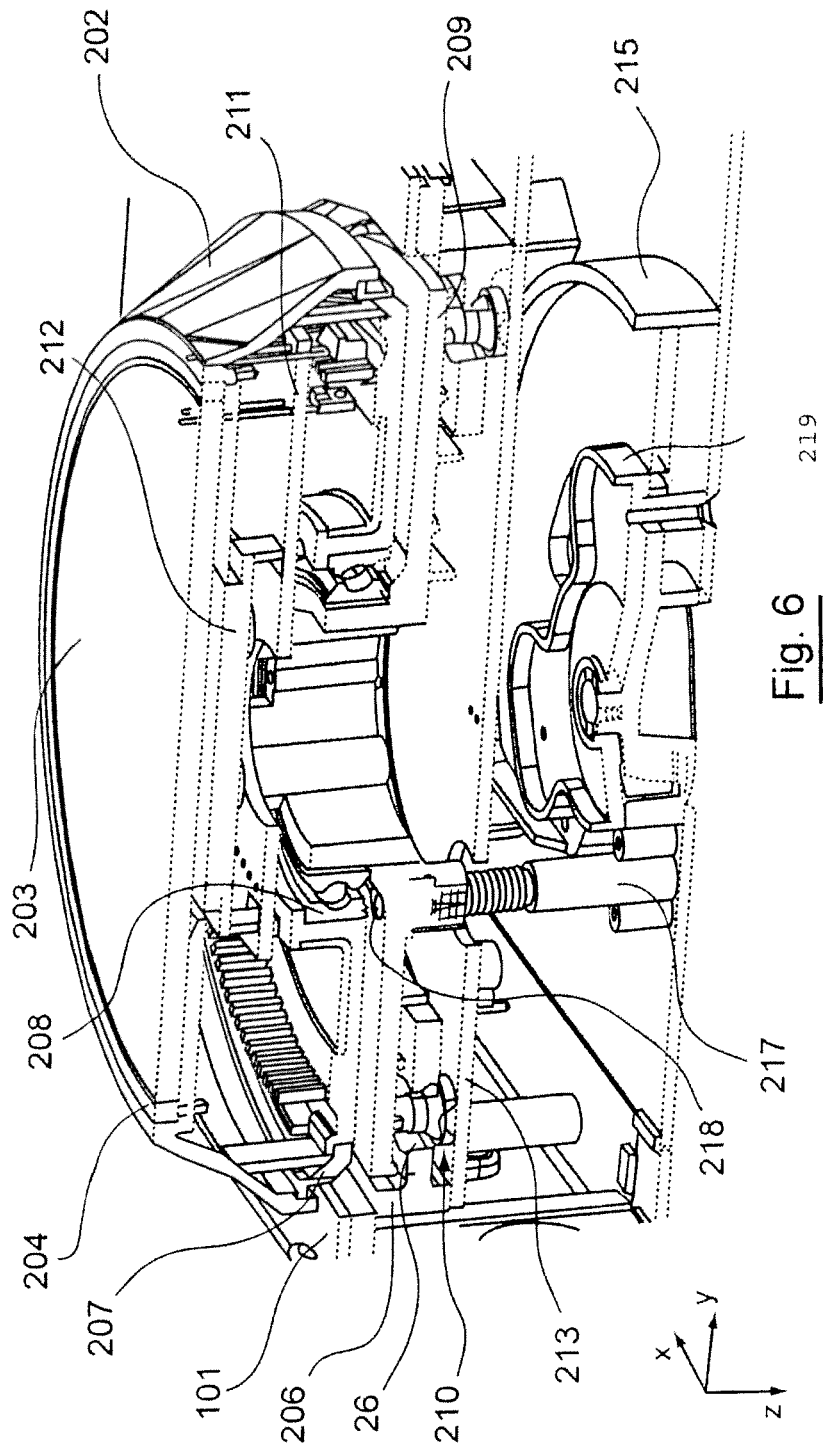
FIG. 6 is a view in section at the level of the jog wheel of the mixing console of FIG. 1.

The elastomer domes 210 with carbon contacts 214 provide elasticity and the detection of touch (detection of translation along an axis z substantially parallel to the axis A) by contact on a printed circuit (not shown in these FIGS. 3 to 5 but referenced 213 in FIG. 6). The fixed support 206 is crossed by these elastomer domes 210 with carbon contact 214. More specifically, each elastomer dome 210 goes through a housing (or opening) 26 of the fixed support 206.

FIG. 7A to 7C are views in schematic section of three alternative embodiments of these elastomer domes (not prestressed).

In FIG. 7A, the elastomer dome 210 (which can be seen in FIGS. 5 and 6) comprises:

at the upper end, a cylindrical part 210A that is solid (and therefore relatively rigid), the cylindrical part 210A being constituted by one or more coaxial cylinders that are superimposed (the coaxial cylinders are then positioned from top to bottom, from the cylinder with the smallest diameter to the cylinder with the greatest diameter, the topmost cylinder preferably having a chamfer to facilitate its insertion) and being housed in a corresponding housing 29 of the support mobile in translation 209 (a upper portion of the cylindrical part 210A is for example inserted by force into this housing 29), at the lower end, a relatively thick (and therefore relatively rigid) annular part 210C that is supported on the printed circuit 213 ("annular" means that the part 210 has a ring shape or tubular shape i.e. a circular form with a vacant circular center), and between the upper and lower ends, a central part 210B that is skirt-shaped (i.e. shaped like a hollow truncated cone or truncated dome) links the cylindrical part 210A to the annular part 210C. This central part can get deformed and enable the cylindrical part 210A and the annular part 210C to come closer together or to move away from each other. This skirt is indeed relatively thin and can therefore get deformed and enable the cylindrical part 210A and a printed circuit 213 to come together (in this case the elastic and deformable skirt gets crushed) or to move apart (in this case the skirt gets deployed). A upper portion of the cylindrical part 210A being fixedly joined to the support mobile in translation 209, hence the cylindrical part 210A is mobile in translation along an axis B which is substantially parallel to the axis of rotation A of the collar 202. As the central part 210B is linked to the rigid cylindrical part 210A and to the rigid annular part 210C that is supported on the printed circuit 213, the central part 210B is deformed when the support mobile in translation 209 is in the "pushed-in" position (i.e. when the user exerts a pressure on the wheel 20 and hence to the support mobile in translation 209). Preferably, the cylindrical part 210A comprises a lower portion which extends into the central part 210B until it reaches the height of the lower end of the truncated portion of the central part 210B (i.e. until it reaches the height of the top of the annular part 210C).

The body of the elastomer dome 210 comprises three parts 210A, 210B, 210C which are coaxial (i.e. these three parts share the same axis B) and symmetrical (i.e. capable of division into similar halves by a longitudinal plane which comprises the axis B substantially parallel to the axis of rotation of the table 201). The diameter and the thickness of the upper part 210A, the central part 210B and the lower part 210C can vary.

These parts 210A, 210B, 210C of the elastomer dome 210 can be made as an injected single part made of elastomer. In such a case, the body of the elastomer dome 210 is monobloc.

In FIG. 7A, a circular element or pill made of carbon 214 fixedly joined to the lower portion of the cylindrical part 210A is housed in the annular part 210C and/or in the central part 210B (but preferably in the annular part 210C). The carbon pill 214 is for example glued to the cylindrical part 210A.

The shape of the parts 210B and 210C guides the translation of the lower portion of the cylindrical part 210A, and hence the translation of the carbon contact 214. When the central part 210B is deformed, the skirt-shape get crushed so that it forms an annular undulation between the lateral sides of lower portion of the cylindrical part 210A and the internal wall of the annular part 210C which prevents a rotation of the lower portion of the cylindrical part 210A.

Depending on the variants of FIGS. 7B and 7C, the elastomer part 210 comprises:

at the upper end, a solid (and therefore relatively rigid) cylindrical part 210A, the cylindrical part 210A being housed in a housing 29 corresponding to the support mobile in translation 209 (it is for example force-fitted into this housing);

between the upper end and the lower end, a part 210B in the form of a solid cylinder which is linked to the cylindrical part 210A and to the circular part 210C, and at the lower end, a circular part 210C, whose upper portion that is skirt-shaped (i.e. shaped like a hollow truncated cone or truncated dome) and whose lower portion is annular, which takes support on the printed circuit 213. The upper portion of the portion 210C links to the part 210B and to the lower annular portion of the part 210C. This circular part 210C is relatively thin and elastic and can therefore get deformed and enable the central part 210B and the printed circuit 213 to come together (in this case the circular part gets crushed) or to move apart (in this case the circular part gets deployed). Preferably, the central part 210B extends into this lower circular part 210C until it reaches the height of the lower end of the truncated portion of the circular part 210C.

A circular element or pill made of carbon 214, fixedly joined to the cylindrical part 210A and the central part 210B is housed in the circular part 210C. The pill 214 is for example glued to the central part 210B.

The diameter of the carbon contact pill of the dome 210 is about 3 to 4 mm. The diameter and the thickness of the carbon contact pill can vary.

The body of the elastomer dome 210 comprises three parts 210A, 210B, 210C and the carbon pill which are coaxial and symmetrical relatively to the axis B.

Merely placing the hand or the fingers lightly on the jog wheel 20 causes a translation of the support mobile in translation 209 along the axis z and hence of the cylindrical part 210A and the central part 210B of at least one of the elastomer domes or of the elastomer dome (if only one dome is provided). The cylindrical part 210A pushes the carbon pill 214 to a conductive part of the printed circuit 213. A signal detecting the translation of the wheel along (z) is then delivered and transmitted to the audio signal processing means.

The structure of the jog wheel 20 furthermore comprises a printed circuit 211 which is screwed onto the support mobile in translation 209 and is mobile in translation only. On this printed circuit 211, a back-illuminated plate 212 is fixed, bearing a logo for example. This logo placed on the back-illuminated plate 212 is visible through the transparent plate 203. Thus, the jog wheel comprises a central lighting and a display zone that is fixed (i.e. a zone which does not rotate when the jog wheel 20 is rotationally driven).

Instead of the back-illuminated plate 212, it is possible to provide for a display device, for example an LCD screen.

As emphasized here above, the mere fact of placing the hand or the fingers lightly on the wheel 20 prompts a translation of the support mobile in translation 209 (and therefore of the elements 201-205, 207, 208, 211 and 212) along the axis z, and therefore a translation of the cylindrical part 210A of at least one of the elastomer domes 210. The circular carbon element 214 (not shown in FIGS. 3 to 6) fixedly joined to the cylindrical part 210A of a dome 210 moves in translation along the axis z until it closes a contact made on the printed circuit (reference 213 in FIG. 6). The closing of at least one contact of the printed circuit brings about the lighting up of the back-illumination through one or more wide-angle (160°) LEDs connected to the printed circuit 213 and mounted on a tubular support which points it or them to the back-illuminated plate 212 (causing the appearance for example of a logo and/or a message), or this closing of at least one contact causes the colors of the back-illumination to change, so as to inform the user that the jog wheel 20 has detected the user's action (as it happens a pressure of the hand along the axis z on the table 201). Thus, the central back-illuminated indicator informs the user of the activation of the "scratch" mode.

In one alternative or as a complement, this indication of activation of the scratch mode can be given to the user on the screen of the computer connected to the mixing console 1, for example and/or by a LED-type luminous indicator for example (not shown), placed on the control surface 101 of the pack 10 of the mixing console 1.

Stopping or resuming the playback of an audio track is done by simple variation of pressure on the jog wheel 20 (the variation being due to the fact that the DJ places or removes his hand or fingers), the sensation being as natural and intuitive as it would be on a vinyl turntable.

In order to vary the force of the pressure to be exerted on the jog wheel, it is possible to choose a stiffness of the elastomer domes 210 and more particularly of their elastic and deformable part that will be higher or lower.

FIG. 6 is a view in section, at the level of the jog wheel 20, of the mixing controller 1 of FIG. 1. In this FIG. 6, domes 210 are pre-stressed (by the weight of the elements that are mobile in translation) but the carbon contact pill of each dome is substantially in the position illustrated in FIGS. 7A to 7C, i.e. at a distance (about 0.5 mm) from the printed circuit 213. A higher pressure (or weight) is therefore needed so that the carbon contact pill of a dome 210 moves along the axis z and comes into contact with the printed circuit 213.

In the exploded view of FIG. 5, it is possible to distinguish the lower face of the support mobile in translation 209 which includes six circular housings 29 in which the cylindrical part 210A of each of the elastomer domes 210 can get engaged. It is possible furthermore to distinguish the lower face of the fixed support 206 in which apertures 26 are made, in each of which an elastomer dome 210 is housed (as illustrated in FIG. 6). The annular part 210C of the elastomer dome 210 is supported on the printed circuit 213. The inner diameter of the annular part 210C of the elastomer dome 210 is about 6 mm and its outer diameter is about 8 mm, hence the encumbrance of the elastomer dome 210 is low. Elastomer is a robust material and the quantity of elastomer is low. Accordingly, the elastomer dome is robust and costs very little.

The implementation of the elastomer domes 210 is advantageous in that, because their upper end is housed in the support mobile in translation 209, they provide for quasi-blocking in translation along the axis z of the jog wheel when the mixing console is being transported, thus preventing or at least minimizing noise nuisance and the risks of deterioration of the jog wheel.

In addition, an elastomer dome of this kind has a service life of about one million cycles. The cost of contact switches or "tact switches" attaining such a service life would be greater. Furthermore, such tact switches give a click sensation at the end of travel, the feel being remote from that given by vinyl turntables.

The structure described here above is furthermore compatible with jog wheels of different sizes, shapes and inertia values and prevents or at the very least limits any wobbling of the wheel whatever its diameter. Depending on preference, a user can replace a 12 cm jog wheel (comprising a plate, a collar and a toothed wheel) cm by a jog wheel of 30 cm diameter for example. The diameter of the wheels is of little importance since the tubular upper part 209A of the support mobile in translation 209 (see FIG. 4) is fixed to the interior of the ball bearing 208 and since the toothed wheel 207 is fixed to the exterior of the ball bearing (it is therefore possible to place an object bigger than the ball bearing on the support mobile in translation 209).

In other words, the structure of the jog wheel enables the use of a ball bearing 208 (or any other type of bearing) of a diameter independent of the diameter of the jog wheel 20. It enables the use of large-diameter wheels while preserving a bearing of smaller diameter, hence one of lower cost.

The tubular upper part 209A of the support mobile in translation 209 serves as a shaft for the rotation of the jog wheel 20 and can also serve as a pedestal supporting the printed circuit 211.

6.2 Other Aspects and Variants

Although the embodiment described here above implements six elastomer domes, only one elastomer dome is enough to implement the detection of a pressure.

The precision of the jog wheels in rotation about an axis substantially parallel to the axis z is 256 steps per revolution (giving 1.4° per step) for a distance of travel along the axis z of about 0.5 mm. Naturally, the distance of travel in translation of the wheel can be smaller or else greater than this value. In particular, according to one variant, the travel in translation can be about one millimeter so that it is more perceptible to the user and makes the maneuvering of such a jog wheel closer to the maneuvering of vinyl turntables.

The plate 203 is not necessarily transparent or translucent throughout its surface. It can therefore be formed by several parts and will include a transparent (or translucent) portion and an opaque portion. Furthermore, a flat ring made of elastomer or polyvinyl chloride can be glued to the plate 203 so as to improve its aesthetic value, giving the user the sensation of handling a vinyl record and/or improving the holding and the adherence of the user's hand to the jog wheel while leaving the central zone of the plate free so that the back-illuminated logo or the display device can be viewed.

To protect the ball bearing 208, it can be planned to add an annular reinforcement plate that is fixed beneath the toothed wheel or encoding wheel 207. This reinforcement plate can be made of metal or plastic. It prevents the bearing from exiting its housing. In this case, the braking device exerts a frictional force on this reinforcement plate and this force is transmitted to the parts mobile in rotation. The spring of the braking device makes it possible to erase any problem of surface state of this reinforcement plate.

The diameter of the pedestal of the support mobile in translation 209 can be greater than that illustrated.

The double-face adhesive 205 can be replaced by screws or by force-fitting.

The printed circuit 211 bearing the back-illuminated plate 212 and the device 216 for detecting teeth can be of a different shape, in particular a circular shape.

The collar 202 can be of a different shape, in particular cylindrical.

The metal ring 204 can be bulkier so as to increase the inertia of the jog wheel. In one alternative, it can be fixed to the toothed wheel 207. In another alternative, such a ring is not planned between the plate and the collar.

The resistance to rotation of the jog wheel can be mechanical but done differently. In this case, a braking device is mounted on the support mobile in translation 209 and uses a skid which slides in the support mobile in translation 209 until a frictional force that is greater or smaller (depending on a manual tightening operation) is exerted on the ball bearing 208.

The resistance to the rotation of the jog wheel can be magnetic. It is thus possible to provide for a metal part which works with a magnet. A screw-based system can be used to adjust the distance between the magnet and the metal part, and therefore the resistance to the rotation of the wheel. In one alternative, there is provided a metal part that cooperates with a coil crossed by an electrical signal and a microprocessor which adjusts the characteristics of the electrical signal so as to increase or diminish the resistance to rotation of the jog wheel.

In one variant of the embodiment described here above, the mixing console can implement several jog wheels according to the invention.

According to one variant of the embodiment described here above, the pushing of the wheel is calibrated by one or more elastomer domes and is detected by one or more switches such as contact switches or tact switches.

In a known way, these contact switches can take two states, namely a "pushed-in" state and a "non-pushed-in" state. They are for example mounted on the fixed support 206, the mobile part of a tact switch being capable of coming into contact with the support mobile in translation 209 when it is moved in translation in the direction of the axis z.

According to another variant of the embodiment described here above, the contact switches can be gradual (analog switches).

The elastomer domes are for example placed on the fixed support 206 and are used to bring the elements mobile in translation of the jog wheel to the neutral position. The stiffness of these elastomer domes is such that the resultant force exerted by these elastomer domes almost compensates for the total weight of the parts mobile in translation relatively to the fixed support 206. The elastomer domes are pre-stressed by this total weight while at the same time enabling travel in translation of these parts when the weight of the user's hand and fingers is added thereto.

The annular part 210 of the elastomer dome may have its internal wall rounded (instead of straight internal wall).

It is possible to add a mechanical screw-based system to block the translation along the axis z of the jog wheel, especially to prevent the jog wheel from making noise when the console is being transported. This blocking system is almost identical to the rotation-braking device and acts on the support mobile in translation.

Furthermore, the ball bearing 208 can be replaced by any other system known to those skilled in the art, especially in the field of mixing consoles, for example a replacement by a bearing (plain bearing, lubricated bearing, magnetic bearing), a needle bearing etc.

In one variant, it is possible that the collar will not be mobile in translation but only in rotation.

The mixing console of FIG. 1 in which the invention is implemented can mix a soundtrack having or not having visual accompaniment.

The invention claimed is:

1. A device for controlling at least one audio signal comprising at least:
   means for commanding comprising at least one plate and one collar, said plate and said collar being mounted so as to be rotationally mobile around an axis of rotation (A) relatively to a footing,
   a first means for detecting a movement in rotation of the means for commanding, capable of delivering a first signal,
   a second means for detecting a movement in translation, along an axis (z) substantially parallel to the axis of rotation (A), of said plate relatively to said footing, capable of delivering a second signal,
   said first signal and/or said second signal feeding means for processing said at least one audio signal,
   characterized in that said second means for detecting comprise at least one pressure sensor delivering said second signal and comprising a sensor body and a contact element, said sensor body comprising at least an elastic part and a substantially rigid part, and
   said elastic part being integrally formed with said substantially rigid part, said contact element being fixed to said substantially rigid part and being housed inside the elastic part, and said elastic parts being deformable along an axis substantially parallel to the axis of rotation of the means for commanding to allow translation of said substantially rigid part and said contact element along said axis substantially parallel to the axis of rotation of the means for commanding.

2. A device according to claim 1, characterized in that said substantially rigid part, and said elastic part of said pressure sensor are made of elastomer.

3. A device according to claim 1, characterized in that said substantially rigid part and said elastic part of said pressure sensor are coaxial.

4. A device according to claim 1, characterized in that it comprises a support bearing at least said plate and mounted so as to be mobile in translation but not in rotation relatively to said footing, said support cooperating with said second means for detecting.

5. A device according to claim 1, characterized in that said collar is mounted so as to be mobile in translation, along an axis (z) substantially parallel to the said axis of rotation, relatively to said footing, said collar having a non-slip surface providing improved grip for a user.

6. A device according to claim 1, characterized in that said contact element designed to close an electrical circuit when a predetermined pressure is exerted on said plate and/or said collar.

7. A device according to claim 6, characterized in that said contact element is a pill substantially coaxial with said substantially rigid part and said elastic part.

8. A device according to claim 4, characterized in that said means for commanding are fixedly joined to a bearing fixed to the support and that said sensor body returns said support to a neutral position when no pressure is exerted by a user on said plate and/or said collar.

9. A device according to claim 8, characterized in that it implements means for braking the movement in rotation of the means for commanding by application of a frictional force to said bearing.

10. A device according to claim 9, characterized in that said braking means comprise a screw, the frictional force applied depending on the tightening of said screw.

11. A device according to claim 1, characterized in that at least one central part of said plate is made out of a transparent or translucent material.

12. A device according to claim 11, characterized in that it implements display means visible through said at least one central part of said plate.

13. A device according to claim 11, characterized in that it implements luminous means visible through said at least one central part of the plate.

14. A device according to claim 4, characterized in that the support comprises a tubular upper part serving as a shaft or as a bearing for the rotation of the means for commanding.

15. A device according to claim 14, characterized in that said tubular upper part supports display means and/or luminous means.

16. An electronic mixing console for the electronic mixing of at least one audio signal comprising at least one control device according to claim 1.

17. A device according to claim 14, characterized in that said support further comprises at least one cylindrical column.

18. A device according to claim 5, characterized in that said collar is substantially truncated-cone shaped.

* * * * *

UNITED STATES PATENT AND TRADEMARK OFFICE
CERTIFICATE OF CORRECTION

PATENT NO.          : 8,903,111 B2
APPLICATION NO.     : 13/303677
DATED               : December 2, 2014
INVENTOR(S)         : Francois Garet and Nicolas Robic Page 1 of 1

It is certified that error appears in the above-identified patent and that said Letters Patent is hereby corrected as shown below:

On the Title Page, in Item [30], under Foreign Application Priority Data, please insert
-- November 25, 2010 (FR) 1059766
    December 6, 2010 (FR) 1060151 --.

Signed and Sealed this
Twenty-eighth Day of July, 2015

Michelle K. Lee
*Director of the United States Patent and Trademark Office*